US008984310B2

(12) United States Patent
Kuroishi et al.

(10) Patent No.: US 8,984,310 B2
(45) Date of Patent: Mar. 17, 2015

(54) POWER SUPPLY CONTROL DEVICE, IMAGE PROCESSING APPARATUS, NON-TRANSITORY COMPUTER-READABLE MEDIUM STORING POWER SUPPLY CONTROL PROGRAM, AND IMAGE PROCESSING CONTROL DRIVER

(75) Inventors: Kenji Kuroishi, Kanagawa (JP);
Motofumi Baba, Kanagawa (JP);
Masafumi Ono, Kanagawa (JP);
Kazuhiko Narushima, Kanagawa (JP);
Kouichi Azuma, Kanagawa (JP);
Hidenori Horie, Kanagawa (JP); Keiko Shiraishi, Kanagawa (JP); Kenta Ogata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 308 days.

(21) Appl. No.: 13/540,119

(22) Filed: Jul. 2, 2012

(65) Prior Publication Data
US 2013/0219198 A1   Aug. 22, 2013

(30) Foreign Application Priority Data
Feb. 22, 2012   (JP) .................................. 2012-036070

(51) Int. Cl.
*G06F 1/32* (2006.01)
*G06F 1/26* (2006.01)

(52) U.S. Cl.
USPC .......................................... 713/310; 713/340

(58) Field of Classification Search
CPC ...................................... G06F 1/32; G06F 1/26
USPC .................................................. 713/310, 340
See application file for complete search history.

(56) References Cited

U.S. PATENT DOCUMENTS

| | | | |
|---|---|---|---|
| 5,752,049 A * | 5/1998 | Lee ................................ | 713/323 |
| 6,353,719 B1 * | 3/2002 | Lee ................................ | 399/69 |
| 2004/0000886 A1 * | 1/2004 | Yun et al. ..................... | 318/268 |
| 2004/0252156 A1 * | 12/2004 | Seshimo ....................... | 347/30 |
| 2007/0242301 A1 * | 10/2007 | Tsuchie et al. ............... | 358/1.14 |
| 2009/0010671 A1 * | 1/2009 | Hashimoto .................... | 399/88 |
| 2009/0297199 A1 * | 12/2009 | Yamashina et al. ........... | 399/70 |
| 2009/0313493 A1 * | 12/2009 | Ide ................................ | 713/323 |
| 2010/0134834 A1 * | 6/2010 | Nishikawa .................... | 358/1.15 |
| 2012/0236353 A1 * | 9/2012 | Nagayama .................... | 358/1.13 |

FOREIGN PATENT DOCUMENTS

| | | |
|---|---|---|
| JP | A-2007-263689 | 10/2007 |
| JP | A-2009-93432 | 4/2009 |

* cited by examiner

*Primary Examiner* — Jaweed A Abbaszadeh
*Assistant Examiner* — Phil Nguyen
(74) *Attorney, Agent, or Firm* — Oliff PLC

(57) ABSTRACT

Provided is a power supply control device including a first power supply which is a power supply source of an operating unit and a main control unit, a second power supply which supplies minimum necessary power to create a power-saving state, a switching unit that switches to a power supply source selected from the first and second power supplies, a receiving unit that receives an external request signal, a determining unit that determines whether the external request signal is a switching request signal or a recovery request signal, a switching controller that switches the power supply source to the first power supply when a power-saving state is created, and the external request signal is the switching request signal, and a recovery unit that recovers at least the main control unit when the recovery request signal is received within a predetermined period after the power supply source is switched.

11 Claims, 14 Drawing Sheets

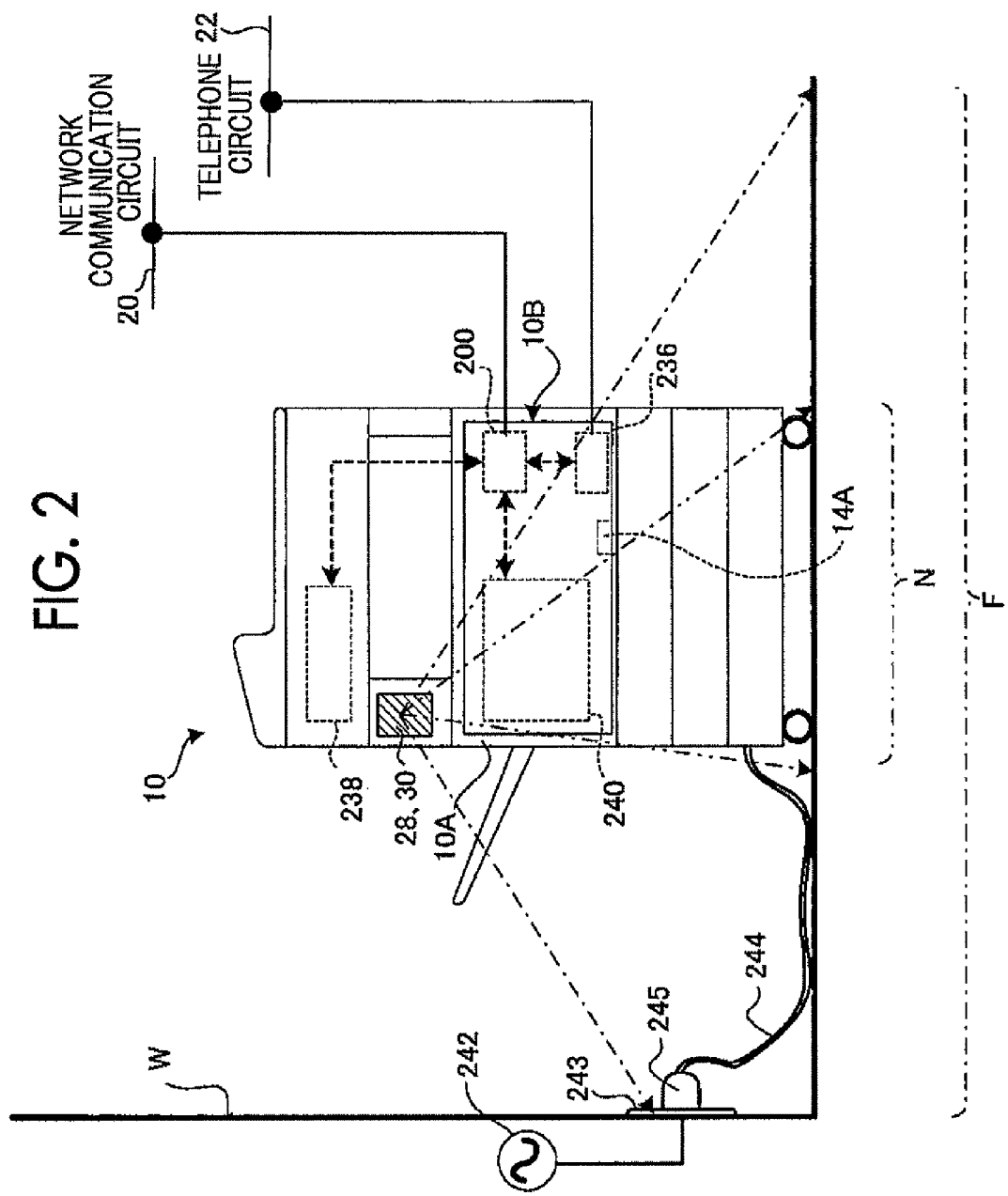

FIG. 6

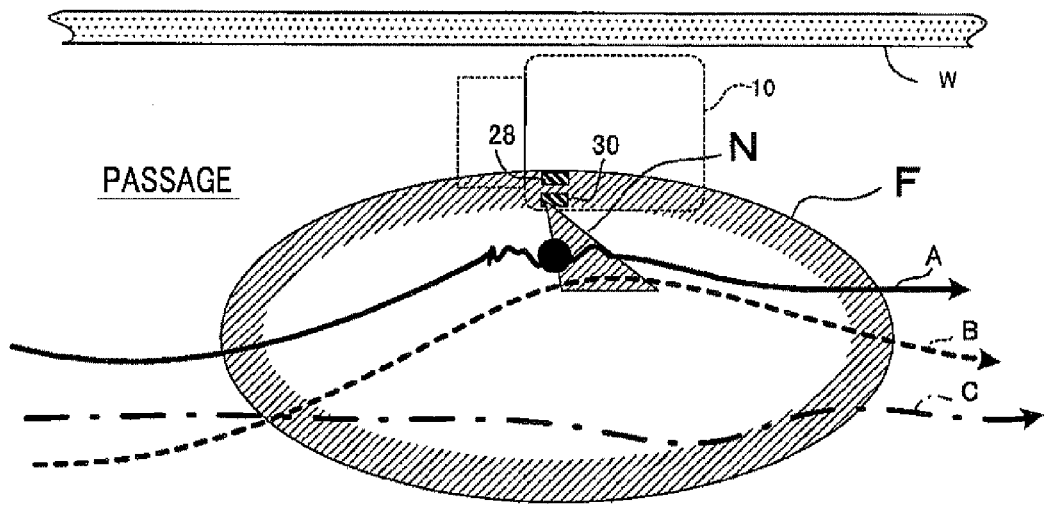

A ⟶ MOVEMENT TRAJECTORY OF PERSON WHO APPROACHES TO POSITION WHERE THE PERSON MAY OPERATE IMAGE PROCESSING APPARATUS, STOPS TO OPERATE FOR USE AND THEN MOVES AWAY FROM THE APPARATUS

MOVEMENT REGION (OUTSIDE THE REGION → REGION F → REGION N → REGION F → OUTSIDE THE REGION)

B ⟶ MOVEMENT REGION OF PERSON WHO PASSES BY NEAR POSITION WHERE THE PERSON MAY OPERATE IMAGE PROCESSING APPARATUS

MOVEMENT REGION (OUTSIDE THE REGION → REGION F → REGION N → REGION F → OUTSIDE THE REGION)

C ⟶ MOVEMENT TRAJECTORY OF PERSON WHO PASSES BY AWAY FROM POSITION WHERE THE PERSON MAY OPERATE IMAGE PROCESSING APPARATUS

MOVEMENT REGION (OUTSIDE THE REGION → REGION F → OUTSIDE THE REGION)

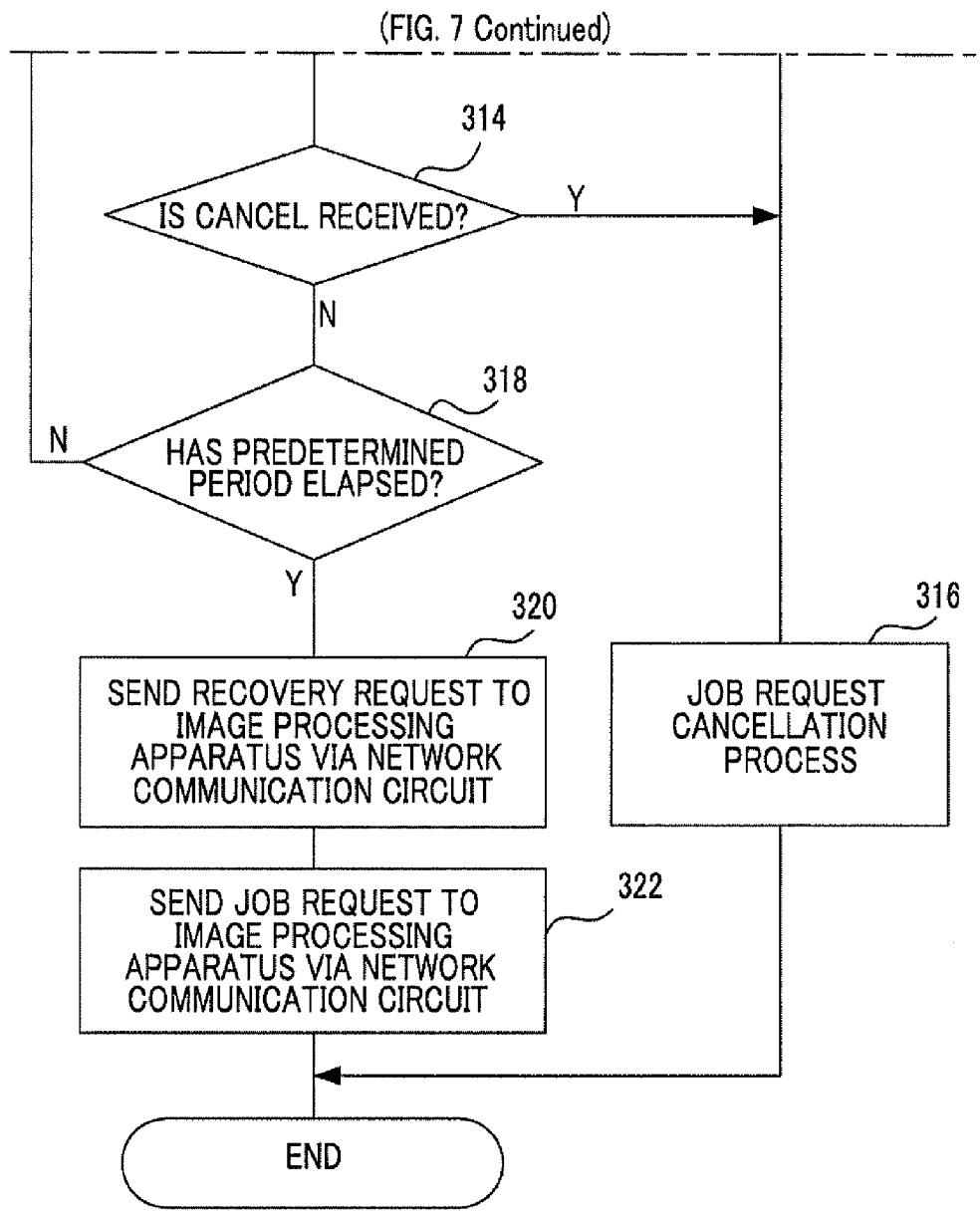

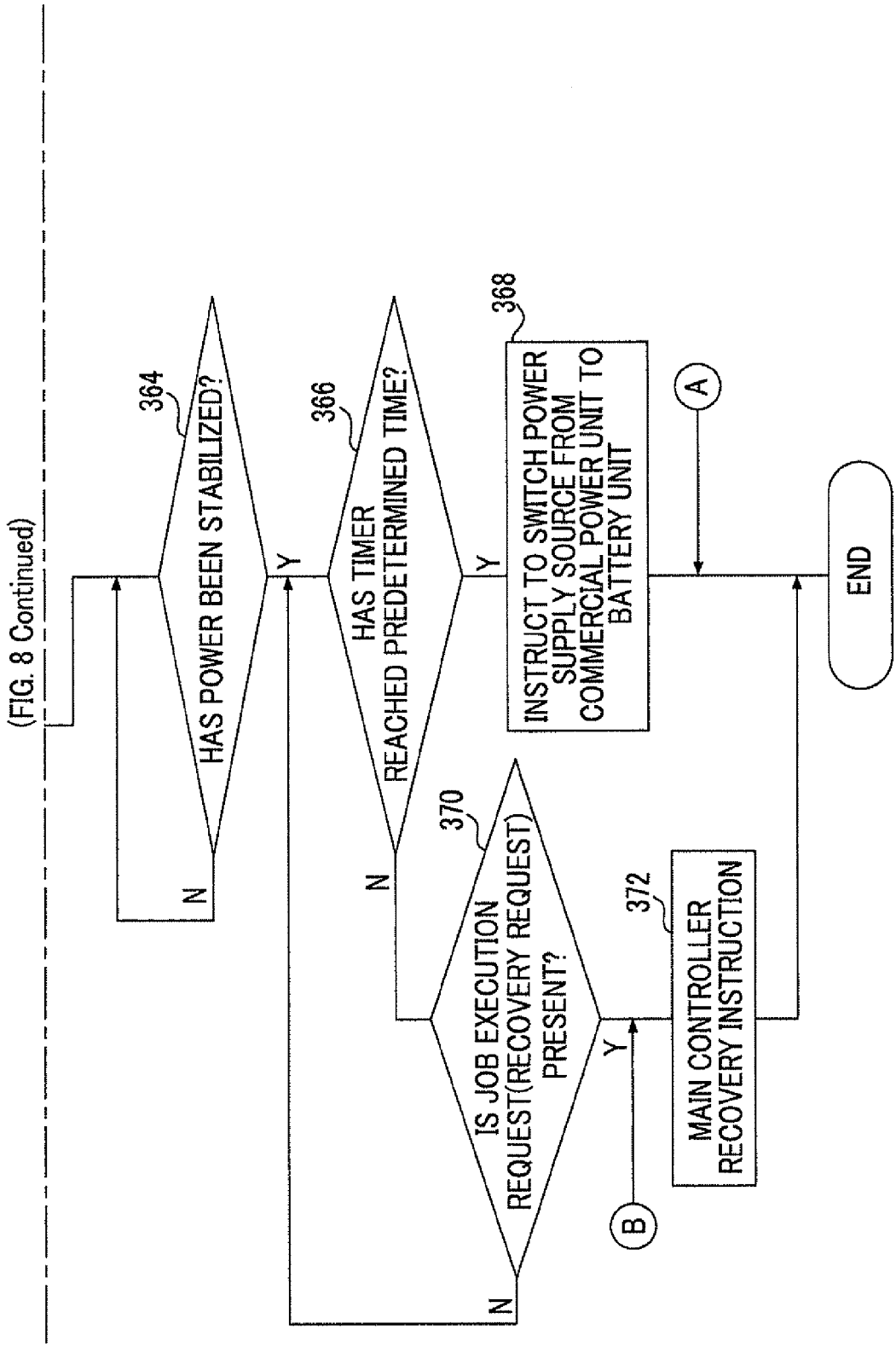

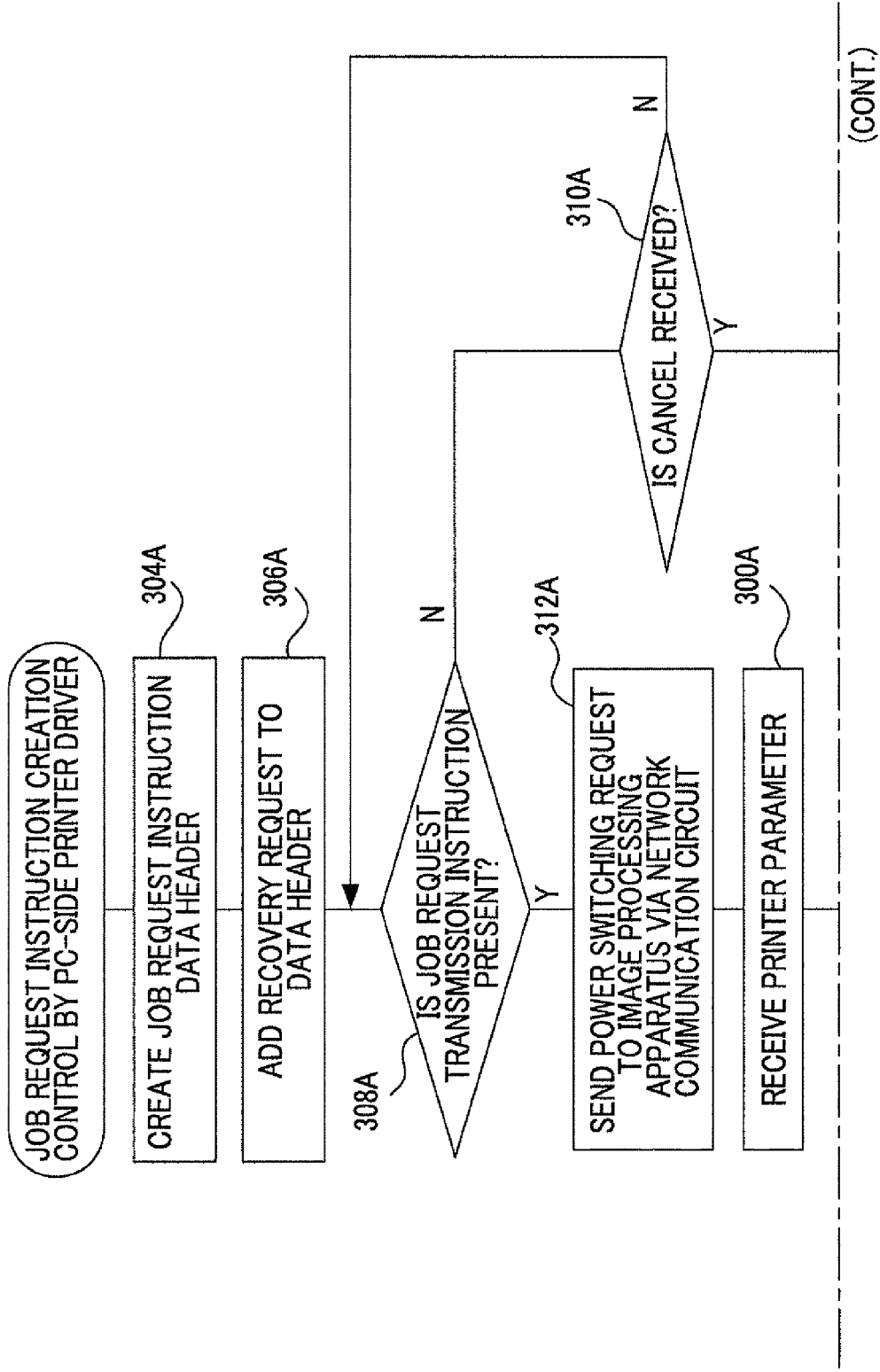

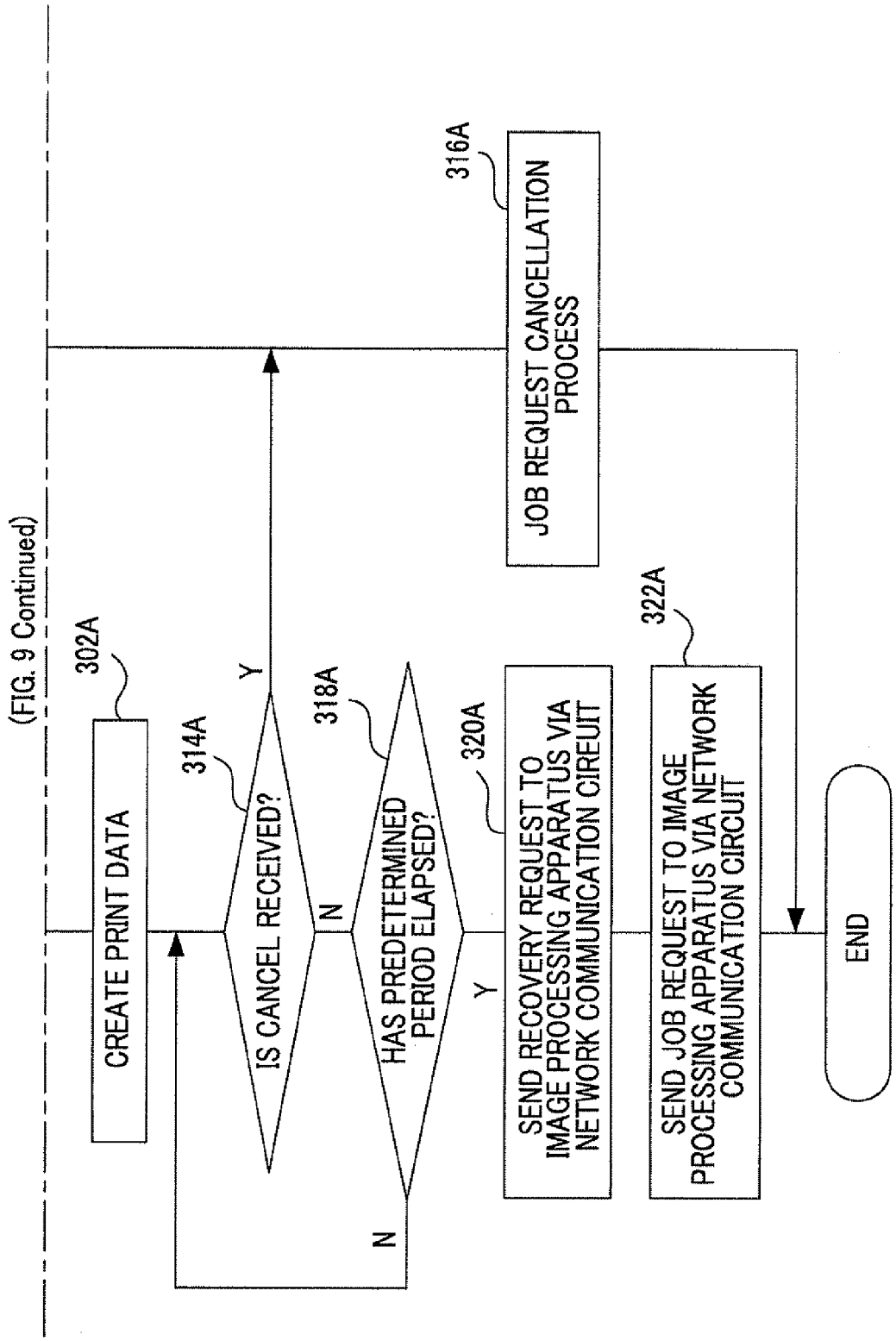

POWER SUPPLY CONTROL DEVICE, IMAGE PROCESSING APPARATUS, NON-TRANSITORY COMPUTER-READABLE MEDIUM STORING POWER SUPPLY CONTROL PROGRAM, AND IMAGE PROCESSING CONTROL DRIVER

CROSS-REFERENCE TO RELATED APPLICATIONS

This application is based on and claims priority under 35 USC 119 from Japanese Patent Application No. 2012-036070 filed Feb. 22, 2012.

BACKGROUND

Technical Field

The present invention relates to a power supply control device, an image processing apparatus, a non-transitory computer-readable medium storing power supply control program, and an image processing control driver.

SUMMARY

According to an aspect of the present invention, there is provided a power supply control device including: a first power supply which is a power supply source of an operating unit that operates with power supplied and a main control unit that controls the operating unit, and which uses commercial power as a main supply source thereof; a second power supply which is a power supply source that is provided separately from the first power supply so as to supply minimum necessary power to create a power-saving state; a switching unit that switches to a power supply source selected from the first and second power supplies; a receiving unit that receives an external request signal which requires the operation of the operating unit and the main control unit; a determining unit that determines whether the external request signal received by the receiving unit is a switching request signal for instructing switching of a power supply destination by the switching unit or a recovery request signal for instructing the supply of power from the first power supply to the operating unit and the main control unit; a switching controller that controls the switching unit so that the power supply source is switched to the first power supply when a power-saving state is created in response to the supply of power from the second power supply, and the determining unit determines that the external request signal is the switching request signal; and a recovery unit that executes an operation of recovering at least the main control unit when the recovery request signal is received by the receiving unit within a predetermined period after the power supply source is switched by the switching controller.

BRIEF DESCRIPTION OF THE DRAWINGS

Exemplary embodiments of the present invention will be described in detail based on the following figures, wherein:

FIG. 2 is a schematic diagram of the image processing apparatus according to the present exemplary embodiment;

FIG. 9 is a flowchart illustrating job request instruction creation control by a PC-side printer driver according to a modification example of FIG. 7.

DETAILED DESCRIPTION

Figure 1A:
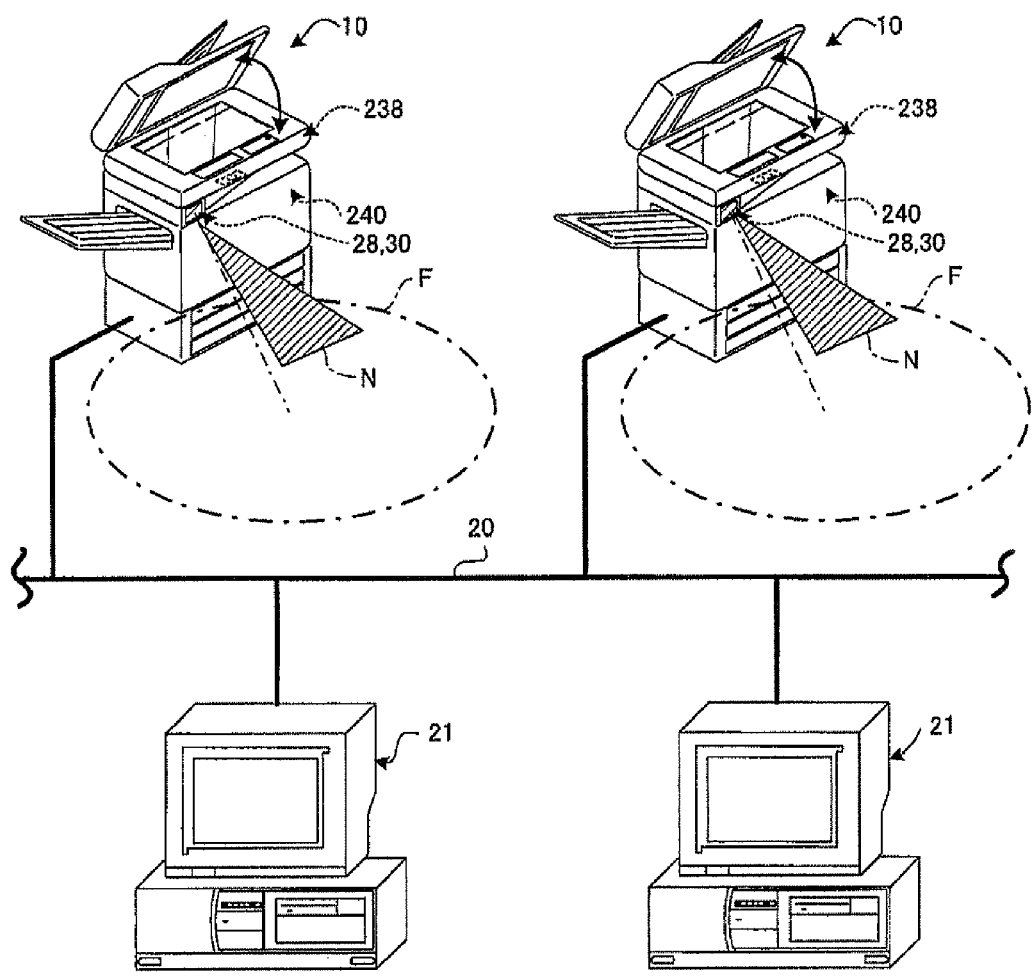
FIGS. 1A and 1B are connection diagrams of a communication circuit network including an image processing apparatus according to a present exemplary embodiment.
Figure 1B:
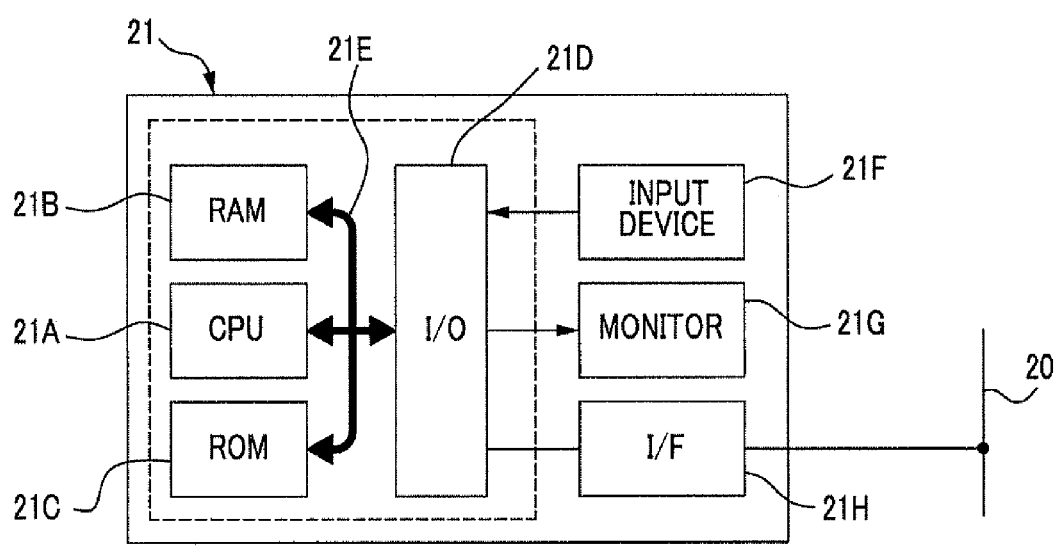

As illustrated in FIGS. 1A and 1B, an image processing apparatus 10 according to the present exemplary embodiment is connected to a network communication circuit 20 such as the Internet. In FIGS. 1A and 1B, although two image processing apparatuses 10 are connected, the number thereof is not limited to this, and one or three or more image processing apparatuses may be connected.

Moreover, multiple personal computer (PCs) 21 serving as information terminals are connected to the network communication circuit 20.

As illustrated in FIG. 1B, the PC 21 includes a CPU 21A, a RAM 21B, a ROM 21C, an I/O 21D, and a bus 213 such as a data bus or a control bus connecting these components to each other.

An input device 21F such as a keyboard or a mouse and a monitor 21G are connected to the I/O 21D. Moreover, the I/O 21D is connected to the network communication circuit 20 via an I/F 21H.

In FIG. 1A, although two PCs 21 are connected, the number thereof is not limited to this, and one or three or more PCs 21 may be connected. Moreover, the information terminal is not limited to the PC 21, and the PC 21 may not necessarily be connected by wires. That is, the communication circuit may transmit and receive information by wireless.

As illustrated in FIG. 1, in the image processing apparatus 10, a user may issue an image formation (print) instruction at a remote site from the PC 21 by transmitting data, for example, to the image processing apparatus 10, or the user may issue instructions to perform processes such as copying, scanning (image reading), or transmission/reception of facsimiles by various operations in front of the image processing apparatus 10.

FIG. 2 illustrates the image processing apparatus 10 according to the present exemplary embodiment.

The image processing apparatus 10 includes an image forming unit 240 that forms an image on a recording sheet, an image reading unit 238 that reads a document image, and a facsimile communication control circuit 236. The image processing apparatus 10 includes a main controller 200, and performs an operation of storing primarily the image data of the document image read by the image reading unit 238 and transmitting the read image data to the image forming unit 240 or the facsimile communication control circuit 236 by controlling the image forming unit 240, the image reading unit 238, and the facsimile communication control circuit 236.

The network communication circuit 20 such as the Internet is connected to the main controller 200, and a telephone circuit network 22 is connected to the facsimile communication control circuit 236. The main controller 200 is connected to a host computer via the network communication circuit 20, for example, and performs the role of receiving image data and executing reception and transmission of facsimiles using the telephone circuit network 22 via the facsimile communication control circuit 236.

The image reading unit 238 includes a platen on which a document is positioned, a scanner driving system that scans the image of the document placed on the platen to irradiate the document with light, and a photoelectric conversion device such as a CCD that receives light reflected or transmitted by the scanning of the scanning driving system and converts the light into electrical signals.

The image forming unit 240 includes photoconductors. Around each of the photoconductors, a charging device that charges the photoreceptor uniformly, a scanning exposure unit that scans a light beam based on image data, an image developing unit that develops electrostatic latent images formed by the scanning exposure of the scanning exposure unit, a transferring unit that transfers the developed image on the photoconductor to a recording sheet, and a cleaning unit that cleans the surface of the photoconductor after the transferring are arranged. Moreover, a fuser that fuses the image on the recording sheet after the transferring is provided on a transporting path of the recording sheet.

In the image processing apparatus 10, a plug 245 is attached to the distal end of an input power line 244, and when the plug 245 is inserted into a wiring plate 243 of a commercial power supply 242 wired up to a wall surface W, the image processing apparatus 10 receives power from the commercial power supply 242.

Hardware Configuration of Control System of Image Processing Apparatus

Figure 3:
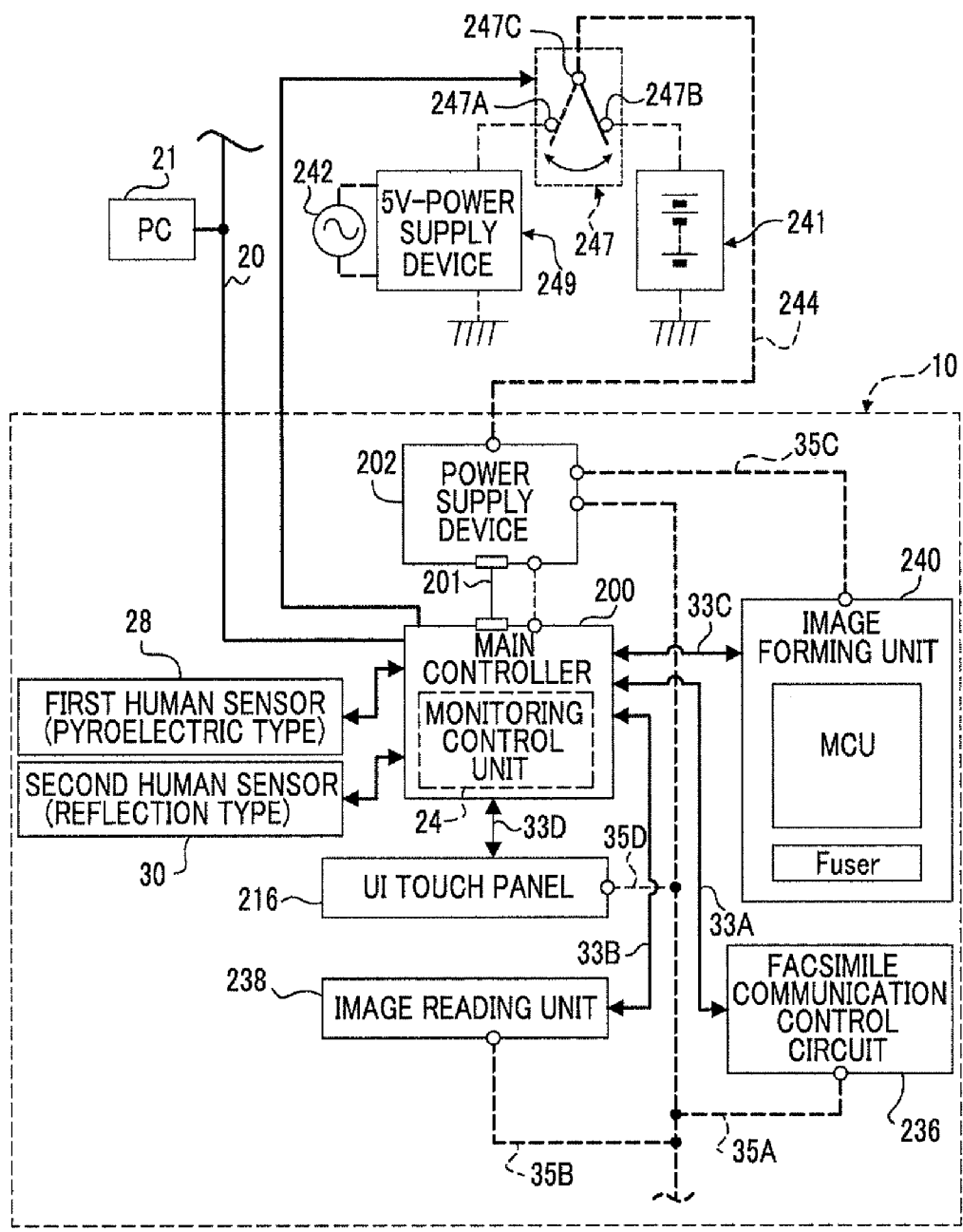
FIG. 3 is a block diagram illustrating the configuration of a control system of the image processing apparatus according to the present exemplary embodiment.

FIG. 3 is a schematic diagram of a hardware configuration of the control system of the image processing apparatus 10.

The network communication circuit 20 is connected to the main controller 200. The facsimile communication control circuit 236, the image reading unit 238, the image forming unit 240, and a UI touch panel 216 are connected to the main controller 200 via buses 33A to 33D such as a data bus or a control bus, respectively. That is, the respective processing units of the image processing apparatus 10 are controlled independently by the main controller 200. In some cases, a UI touch panel backlight unit (see FIG. 4) is attached to the UI touch panel 216.

Moreover, the image processing apparatus 10 includes a power supply device 202 and is connected to the main controller 200 via a signal harness 201.

The power supply device 202 receives power from the commercial power supply and receives power during a sleep mode via the power selecting unit 247 from the power supply device 249 (power is supplied from the commercial power supply 242) or a battery unit 241.

The power selecting unit 247 is a two-contact switching structure, in which the commercial power supply 242 is connected to a first contact terminal 247A, the battery unit 241 is connected to a second contact terminal 247B, and a common terminal contact 247C is selectively connected. Thus, power from the commercial power supply 242 or the battery unit 241 is supplied to the power supply device 202. The switching of the contact is executed by a relay mechanism (not illustrated).

The power supply device 202 includes power supply lines 35A to 35D that independently supply power to the main controller 200, the facsimile communication control circuit 236, the image reading unit 238, the image forming unit 240, and the UI touch panel 216, respectively. Thus, the main controller 200 enables so-called partial power-saving control to be realized by individually supplying power (power-supplying mode) or cutting the power supply (sleep mode) to respective processing units (devices).

Moreover, two human sensors of first and second human sensors 28 and 30 are connected to the main controller 200 so as to monitor the presence of a person around the image processing apparatus 10. The first and second human sensors 28 and 30 will be described later.

Main Functional Block Diagram of Partial Power-Saving Configuration

Figure 4:
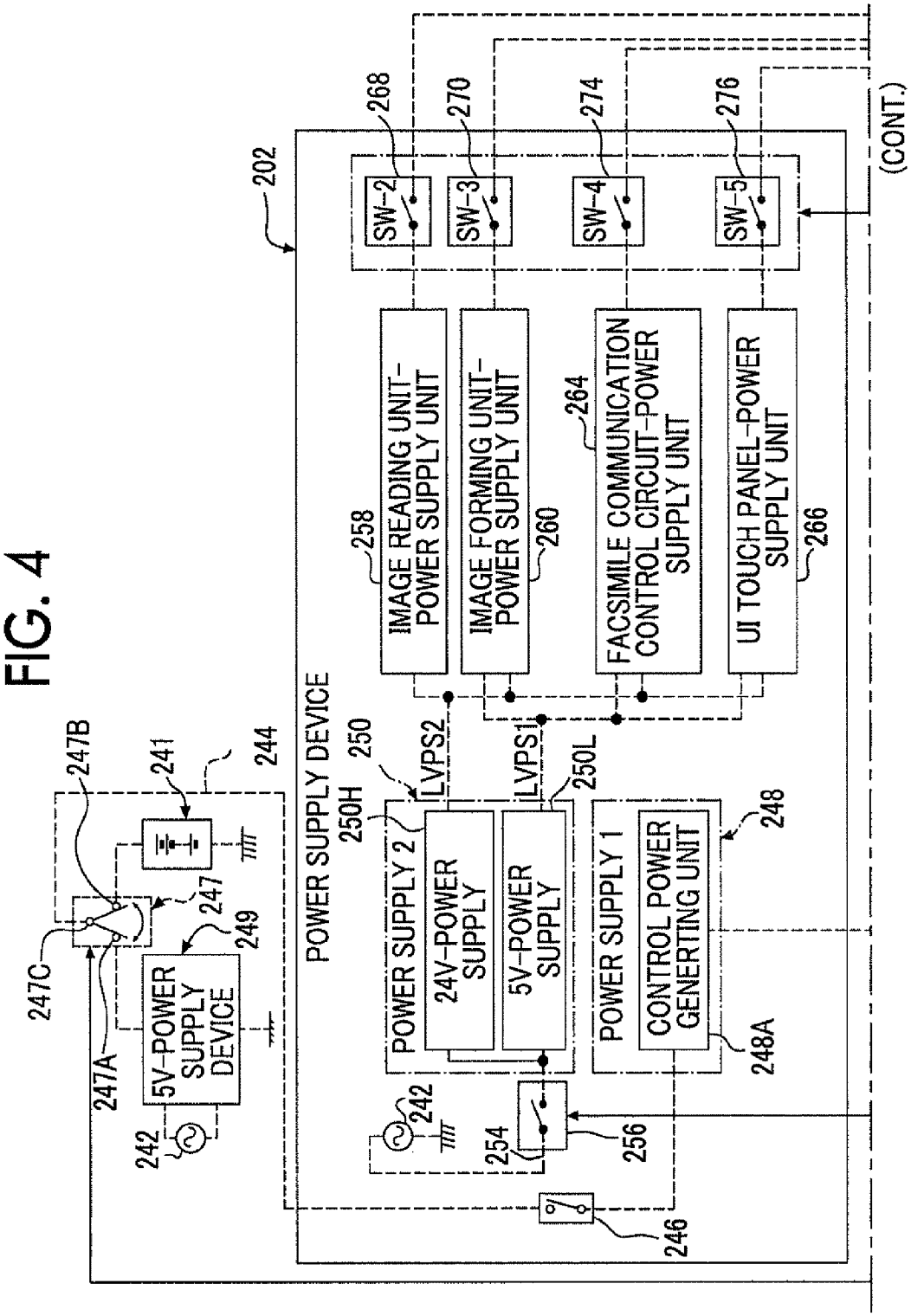
FIG. 4 is a schematic functional diagram of the control system of a main controller and a power supply device according to the present exemplary embodiment.

FIG. 4 is a schematic configuration diagram illustrating the processing units (sometimes referred to as "devices," "modules," or the like) controlled by the main controller 200 and power lines of the power supply device 202 for supplying power to the main controller 200 and respective devices. In the present exemplary embodiment, the image processing apparatus 10 enables individually to supply power or cut the power supply to respective processing units (partial power-saving).

The processing unit-based partial power-saving is an example, but the processing units may be classified into several groups so that respective groups are subjected to power-saving control, and the processing units may be collectively subjected to power-saving control.

Main Controller 200

As illustrated in FIG. 4, the main controller 200 includes a CPU 204, a RAM 206, a ROM 208, an I/O (input/output unit) 210, and a bus 212 such as a data bus or a control bus connecting these components to each other. The UT touch panel 216 (including a backlight unit 216BL) is connected to the I/O 210 via a UT control circuit 214. Moreover, a hard disk (HDD) 218 is connected to the I/O 210. The CPU 204 operates based on the programs recorded in the ROM 208, the hard disk 218, and the like, whereby the function of the main controller 200 is realized. The image processing function may be realized by installing the programs from a recording medium (CDs, DVDs, Blu-ray discs (BD), USB memories, SD memories, or the like) storing the programs therein and operating the CPU 204 based on the programs.

A timer circuit 220 and a communication circuit I/F 222 are connected to the I/O 210. Furthermore, the respective devices of the facsimile communication control circuit (modem) 236, the image reading unit 238, and the image forming unit 240 are connected to the I/O 210.

The timer circuit 220 is configured to measure time as a trigger for putting the facsimile communication control circuit 236, the image reading unit 238, and the image forming unit 240 into a power-saving state (non-power supplying state) (hereinafter the timer circuit is sometimes referred to as a "system timer").

The main controller 200 and the respective devices (the facsimile communication control circuit 236, the image reading unit 238, and the image forming unit 240) are supplied with power from the power supply device 202 (see dotted lines in FIG. 4). Although the power line is depicted by one line (dotted line) in FIG. 4, the power line is actually made up of two or three wires.

Power Supply Device 202

As illustrated in FIG. 4, the input power line 244 lead in from the power selecting unit 247C is connected to a main switch 246. When the main switch 246 is turned on, power can be supplied to a first power supply 248. A second power supply 250 is wired so that it receives power from the commercial power supply 242.

The first power supply 248 includes a control power generating unit 248A and is connected to a power supply control circuit 252 of the main controller 200. The power supply control circuit 252 supplies power to the main controller 200 and is connected to the I/O 210 to perform switching control for selectively conducting electricity to power supply lines connected to the respective devices (the facsimile communication control circuit 236, the image reading unit 238, and the image forming unit 240) in accordance with a control program of the main controller 200.

On the other hand, a first sub-power switch 256 (hereinafter sometimes referred to as a "SW-1") is interposed in a power line 254 connected to the second power supply 250 from the commercial power supply 242. The on/off of the SW-1 is controlled by the power supply control circuit 252. That is, when the SW-1 is turned off, the second power supply 250 does not function (that is, power consumption is 0).

The second power supply 250 includes a 24V-power supply 250H (LVPS2) and a 5V-power supply 250L (LVPS1). The 24V-power supply 250H (LVPS2) is a power supply used mainly for a motor or the like.

The 24V-power supply 250H (LVPS2) and the 5V-power supply 250L (LVPS1) of the second power supply 250 are selectively connected to an image reading unit-power supply unit 258, an image forming unit-power supply unit 260, a facsimile communication control circuit-power supply unit 264, and a UI touch panel-power supply unit 266.

The image reading unit-power supply unit 258 is connected to the image reading unit 238 via a second sub-power switch 268 (hereinafter sometimes referred to as a "SW-2") with the 24V-power supply 250H (LVPS2) as an input source.

The image forming unit-power supply unit 260 is connected to the image forming unit 240 via a third sub-power switch 270 (hereinafter sometimes referred to as a "SW-3") with the 24V-power supply 250H (LVPS2) and the 5V-power supply 250L (LVPS1) as an input source.

The facsimile communication control circuit-power supply unit 264 is connected to the facsimile communication control circuit 236 and the image forming unit 240 via a fourth sub-power switch 274 (hereinafter sometimes referred to as a "SW-4") with the 24V-power supply 250H (LVPS2) and the 5V-power supply 250L (LVPS1) as an input source.

The UI touch panel-power supply unit 266 is connected to the UI touch panel 216 (including the backlight unit 216BL) via a fifth sub-power switch 276 (hereinafter sometimes referred to as a "SW-5") with the 24V-power supply 250H (LVPS2) and the 5V-power supply 250L (LVPS1) as an input source. The original function (function excluding the backlight unit 216BL) of the UI touch panel 216 may include a function of supplying power from a power-saving monitoring control unit 24.

The on/off of the second, third, fourth, and fifth sub-power switches 268, 270, 274, and 276 is controlled based on a power supply selection signal from the power supply control circuit 252 of the main controller 200 similarly to the first sub-power switch 256. Although not illustrated in the drawing, two types of switches and wires are connected to the 24V-power supply 250H and the 5V-power supply 250L. Moreover, the power switches 268 to 276 may be disposed in the respective devices of the power supply destination rather than in the power supply device 202.

In the above configuration, since power is supplied to one of the respective devices (the facsimile communication control circuit 236, the image reading unit 238, and the image forming unit 240) corresponding to a selected function and no power is supplied to devices unnecessary for an instructed function, minimum necessary power is consumed.

Monitoring Control for State Transition of Image Processing Apparatus

Here, in some cases, the main controller 200 of the present exemplary embodiment may enter a mode where a partial function thereof is stopped so that minimum necessary power is consumed. Alternatively, in some cases, the main controller 200 may enter a mode where the supply of power to most part of the main controller 200 is stopped. These modes are sometimes collectively referred to as "sleep mode (power-saving mode)" (see FIG. 5).

The sleep mode begins by starting the system timer when image processing ends, for example. That is, the supply of power is stopped when a predetermined period has elapsed after the system timer is started. Naturally, when a certain operation (operation of hard keys or the like) is performed before the predetermined period has elapsed, the counting of the system timer for activating the sleep mode stops, and the system timer starts when the next image processing ends.

On the other hand, during the sleep mode, the power-saving monitoring control unit 24 to which power is always supplied is connected to the I/O 210. The power-saving monitoring control unit 24 may be configured as an IC chip or the like, which is called an ASIC, for example, and in which an operation program is stored, and which includes a CPU, a RAM, a ROM, and the like which are processed by the operation program.

In monitoring during the power-saving mode, it is assumed that a print request or the like is received from a communication circuit detection unit, or a FAX reception request is received from a FAX circuit detection unit, for example, the power-saving monitoring control unit 24 supplies power to devices which are in the sleep mode (power-saving mode) by controlling the first to fifth sub-power switches 256, 268, 270, 274, and 276 via the power supply control circuit 252.

Moreover, a power-saving control button 26 (sometimes referred to simply as a "power-saving button 26") is connected to the I/O 210 of the main controller 200, and the user may cancel the power-saving mode by operating the power-saving control button 26 during the power-saving mode. The power-saving control button 26 also has a function of forcibly cutting the supply of power to a processing unit by being operated when power is supplied to the processing unit to thereby creating a power-saving state.

Here, in order to perform monitoring in the sleep mode, it is preferable that minimum necessary power is supplied to the power-saving control button 26 and respective detection units during the power-saving mode in addition to the power-saving monitoring control unit 24. That is, in some cases, in the sleep mode which is a non-power-supplying mode, power necessary for determining whether or not to supply predetermined power (0.5 W or smaller, for example) or smaller is supplied.

A period in which minimum necessary power is supplied mainly to an input system such as the main controller 200, the UI touch panel 216, or the IC card reader 217 may be prepared as a specific period of the sleep mode. This period is prepared in consideration of user's convenience. In this case, in the UI touch panel 216, it is preferable to turn off the backlight unit 216BL or decrease the brightness to be smaller than the normal brightness in order to secure energy saving properties.

Figure 5:
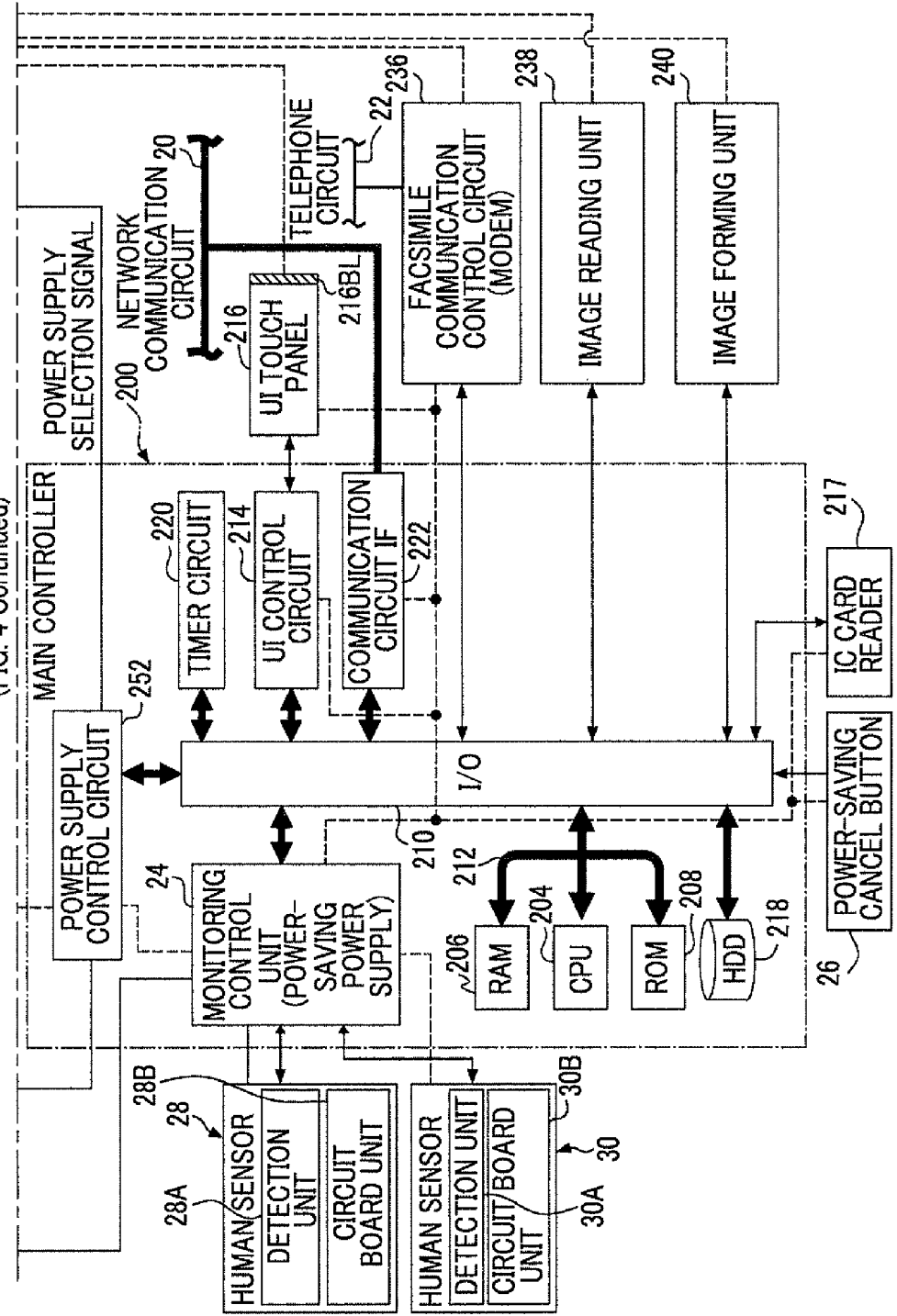
FIG. 5 is a timing chart illustrating respective mode states and an event that triggers the transition of the corresponding mode state in an image processing apparatus.

In FIG. 5, although the specific period is tentatively denoted by an awake mode (awk), for example, this mode is not particularly necessary.

However, there is a case where during the sleep mode, when a user stands in front of the image processing apparatus

10 to operate the power-saving control button 26 to resume the supply of power, it takes time until the image processing apparatus 10 starts up.

Therefore, first and second human sensors 28 and 30 are provided in the power-saving monitoring control unit 24, so that in the sleep mode, the human sensor detects the user before the user presses a power-saving cancel button to resume the supply of power immediately, and the user may use the image, processing apparatus 10 immediately. Although the power-saving control button 26, the first human sensor 28, and the second human sensor 30 are used together, all monitoring operations may be performed by only the first and second human sensors 28 and 30.

As illustrated in FIG. 4, the first and second human sensors 28 and 30 include detection units 28A and 30A and circuit board units 28B and 30B, and the circuit board units 28B and 30B adjust the sensitivity of the signals detected by the detection units 28A and 30A and generate output signals.

Although the first and second human sensors 28 and 30 use the expression "human sensing", this is a proper noun according to the present exemplary embodiment, it is sufficient that at least people may be sensed (detected). In other words, human sensing also involves sensing (detection) of a moving body other than a person. Thus, in the following description, although a detection target of a human sensor is sometimes described to be "person," a robot or the like that executes the role of a person also belongs to the detection range in the future. Conversely, if there is a special sensor capable of identifying and sensing a person, the special sensor may be employed. In the following description, a moving body, a person, a user, and the like are regarded to be synonymous as the target to be detected by the first and second human sensors 28 and 30, and are distinguished as necessary.

The first human sensor 28 is configured to detect a movement of a moving body in the periphery (for example, a range of 1 to 5 m) of the image processing apparatus 10. In this case, an infrared sensor (pyroelectric sensor) or the like which uses the pyroelectric effect of a pyroelectric element is a typical example of the first human sensor 28. In the present exemplary embodiment, a pyroelectric sensor is employed as the first human sensor 28.

On the other hand, the second human sensor 30 is configured to detect the presence or absence of a moving body. A reflection-type sensor or the like which includes a light-transmitting portion and a light-receiving portion is a typical example of the second human sensor 30. The light-transmitting portion and the light-receiving portion may be separated from each other.

Maximum detection ranges (for example, a first region F and a second region N of FIG. 6) are set for the first and second human sensors 28 and 30, respectively.

Figure 6:
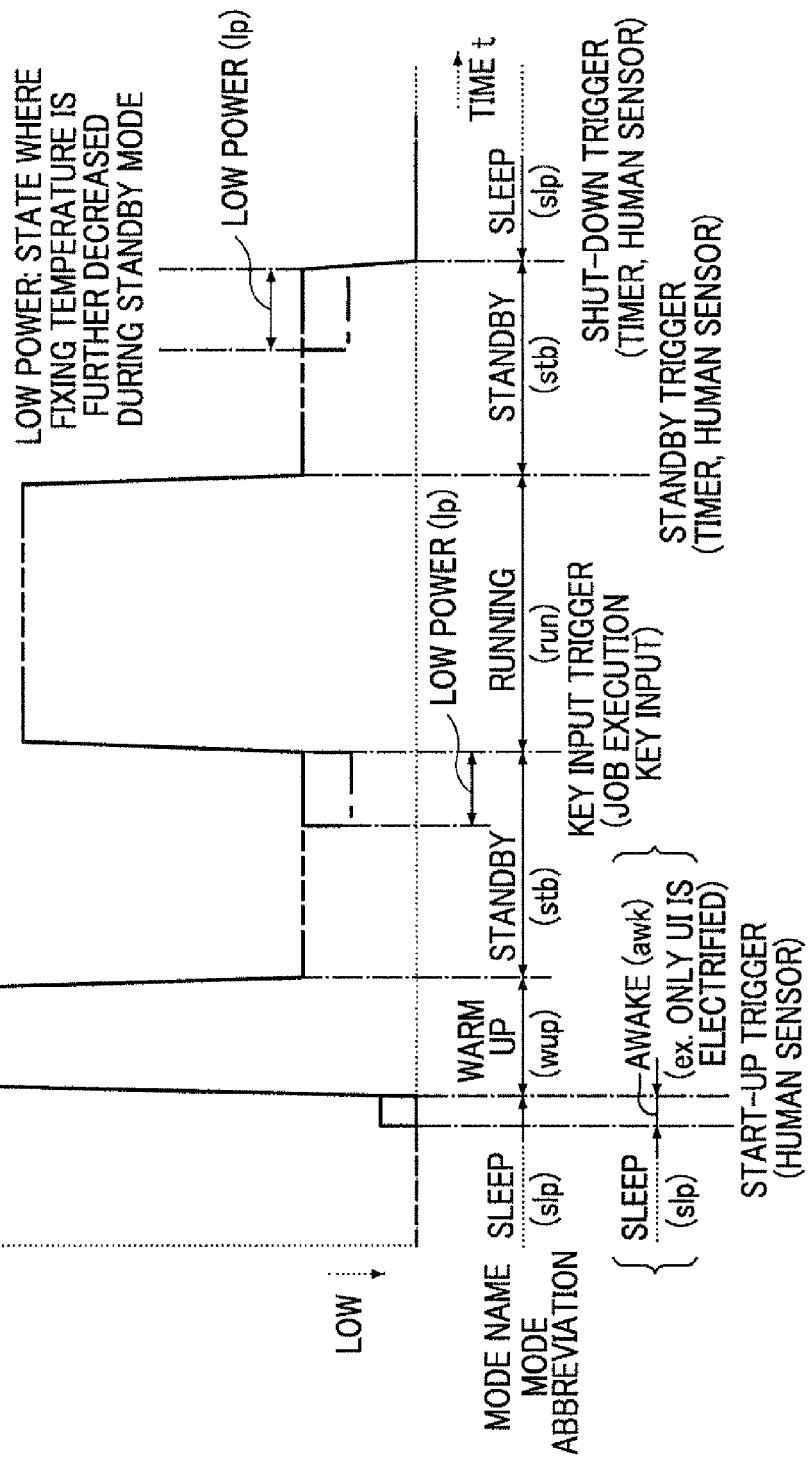
FIG. 6 is a plan view illustrating an image processing apparatus and the periphery thereof according to the present exemplary embodiment.

The first region F (sometime referred to simply as "region F") of FIG. 6, which is a relatively far detection region, is the detection region of the first human sensor 28 and functions as a remote moving body detection means. Moreover, the second region N (sometimes referred to simply as "region N") of FIG. 6, which is a relatively near detection region, is the detection region of the second human sensor 30 and functions as a near moving body detection means.

The detection region (see the first region F of FIG. 6) of the first human sensor 28 is roughly about 2 to 3 m, which depends on the environment where the image processing apparatus 10 is installed. On the other hand, the detection region (see the second region N of FIG. 6) of the second human sensor 30 is roughly about 0 to 0.5 m, which is the range where the user may operate the UI touch panel 216 or the hard keys of the image processing apparatus 10.

Power Switching Control

However, the monitoring control using the human sensors 28 and 30 and the monitoring control corresponding to a print request from the communication circuit detection unit and a FAX reception request from the FAX circuit detection unit consume power. On the other hand, it is preferable that the minimum necessary power, more preferably, no power, is consumed in the "sleep mode". Thus, in the present exemplary embodiment, the power selecting unit 247 switches to the second contact terminal 247B (see FIG. 3) to receive power from the battery unit 241 so that no power is received from the commercial power supply 242 during the sleep mode, and a sleep mode state with literally "power consumption 0" is created.

That is, in the mode transition diagram illustrated in FIG. 5, in response to a shut-down trigger when a standby mode transitions to the sleep mode, the contact of the power selecting unit 247 switches to the second contact terminal 247B in accordance with a signal from the power-saving monitoring control unit 24 of the main controller 200.

As an example of power recovery control using the first and second human sensors 28 and 30, it is ideal to supply power to only the first human sensor 28 during the sleep mode, supply power to the second human sensor 30 when the first human sensor 28 detects a moving body (user or the like), and switch to the commercial power supply 242 and activate the main controller when it is confirmed that the moving body has approached the image processing apparatus.

In contrast, when issuing a request from the outside of the image processing apparatus 10, namely, a request for an image formation instruction (hereinafter sometimes referred to as a "print instruction") from the PC 21 (see FIGS. 1A and 1B), the operator of the PC 21 registers information on the print instruction and transmits a job execution request to the image processing apparatus 10 together with image information (print data) in accordance with a setting screen of a printer driver control program installed in advance in the PC.

In this case, if the image processing apparatus 10 is in the sleep mode, first, the supply of power from the battery unit 241 is switched to the supply of power from the commercial power supply 242 by a contact switching operation of the power selecting unit 247. After that, recovery processing of the main controller 200 is performed, whereby print instruction information (sheet type and size, fonts, print data, and the like) is received.

In this case, issuing the request from the outside is good for an energy-saving measure called sleep mode as compared to directly operating the image processing apparatus 10. However, a prompt action is not taken on the print instruction request from the PC 21, and convenience is not sufficient. In addition, when a recovery request is received in advance, it is possible to secure time for recovery processing and to secure convenience. However, for example, when a job cancellation event occurs, energy-saving properties are not sufficient.

Therefore, in the present exemplary embodiment, the printer driver adds a power switching request and a recovery request as information which comes earlier than the request such as a print instruction included in the job execution request. First, the printer driver sends the power switching request and then sends a recovery request (the earliest information of the job execution request). The printer driver is a program installed in the PC 21, and the image processing apparatus 10 is physically separated from the PC 21 in which the printer driver is installed. However, the printer driver is a program unique to the image processing apparatus 10 in which the printer driver is applied and functions as a part of the control system of the image processing apparatus 10.

On the other hand, in the main controller 200 (in particular, the monitoring control unit 24 and the power supply control circuit 252) of the image processing apparatus 10, even when the image processing apparatus 10 is in the sleep mode (during operation with the battery unit 241), power switching control with no delay and operation errors is established.

Next, the operation of the present exemplary embodiment will be described.

Mode Transition of Power Supply Control of Image Processing Apparatus 10 (Device)

First, respective mode states and an event that triggers the transition of the corresponding mode state in the image processing apparatus 10 will be described with reference to the timing chart illustrated in FIG. 5.

When processing is not performed, the operation state of the image processing apparatus 10 enters the sleep mode, and in the present exemplary embodiment, power is supplied to only the power-saving monitoring control unit 24. Moreover, in this case, power from the commercial power unit 242 is completely cut, and the image processing apparatus 10 operates with the power from the battery unit 241.

Here, when a start-up trigger (detection of start-up trigger or operation of the power-saving control button 26 or the like) occurs, the operation state transitions to a warm-up mode.

By defining a period after the start-up trigger as asleep mode, only the UI touch panel 216 may be activated with power supplied to the main controller 200. Alternatively, when the main controller 200 and the UI touch panel 216 are activated, since the amount of power supplied increases more than that when power is supplied to only the power-saving monitoring control unit 24, the above period may be defined tentatively as an awake mode "awk" (see the letters in parenthesis of a sleep mode range in the transition diagram of FIG. 5). When there is an operation input (key input) to the UI touch panel 216 or the like during the awake mode, the operation state transitions to a warm-up mode.

Examples of the start-up trigger include a job execution request from the outside such as the PC 21 and a signal or information based on the detection result of the second human sensor 30 (the second human sensor 30 is activated based on detection of a moving body by the first human sensor 28). A power-saving cancellation operation by the operator may be used as the start-up trigger. Moreover, when the start-up is triggered in response to transmission of the job execution request from the outside, since a job is not fixed, the operation state may directly transition from the sleep mode to the warm-up mode.

Since the warm-up mode ensures that the image processing apparatus 10 may perform processing immediately, although the largest amount of power is consumed among the respective modes, when an IH heater is used as a heater of a fuser, for example, the warm-up mode period is relatively shorter than that of a heater which uses a halogen lamp.

When a warm-up operation by the warm-up mode ends, the image processing apparatus 10 transitions to a standby mode. When there is a recovery request from the PC 21, it is preferable to transition to at least the standby mode.

The standby mode is literally a mode where "preparations for a job are completed," and the image processing apparatus 10 is in a state where an image processing operation may be executed immediately.

Thus, when there is a key input for instructing execution of a job, the operation state of the image processing apparatus 10 transitions to a running mode, and image processing is executed based on the instructed job.

When image processing ends (when all of plural consecutive jobs on a print queue is completed), the operation state of the image processing apparatus 10 transitions to the standby mode in response to a standby trigger. After the image processing, the counting of the system timer may be started, and the standby trigger may be output after the elapse of a predetermined period so that the operation state transitions to the standby mode.

When there is a job execution instruction during the standby mode, the operation state transitions again to the running mode. Then, the operation state transitions to the sleep mode when a shut-down trigger is detected or a predetermined period has elapsed.

Examples of the shut-down trigger include an operation of the power-saving control button 36 or the like. The system timer may be used together.

In an actual operation of the image processing apparatus 10, the transition of the mode states does not occur exactly the same as the time-sequential order illustrated in the timing chart. For example, processing may be stopped in the standby mode following the warm-up mode, and the operation state may transition to the sleep mode.

Here, the respective devices operating with the power supplied transition from the sleep mode in FIG. 5 to the standby mode via the awake mode and the warm-up mode, whereby respective processes may be executed immediately.

As above, although the image processing apparatus 10 of the present exemplary embodiment transitions between respective modes, the amount of power supplied is different from one mode to another.

The image processing apparatus 10 of the present exemplary embodiment transitions to the sleep mode when predetermined conditions are satisfied (for example, when walk-off information of moving body (user) is output by the human sensor 30, or a shut-down trigger is output due to the time-up of the system timer). In the sleep mode, the supply of power to the main controller 200 excluding the power-saving monitoring control unit 24 and the UI touch panel 216 as well as the respective devices of the facsimile communication control circuit 236, the image reading unit 238, and the image forming unit 240 is cut. Furthermore, the power supply source is switched from the commercial power unit 242 to the battery unit 241, and power is supplied to only the monitoring control unit 24.

Here, in the present exemplary embodiment, if a job request is received from the PC 21 during the sleep mode, that is, when only the monitoring control unit 24 is operated with the power of the battery unit 241, it is necessary to immediately switch the power supply source to the commercial power unit 242, recover the main controller 200, and make preparations for receiving print instruction information. In this case, although excellent energy-saving properties are obtained, convenience is not sufficient.

On the other hand, even if the recovery request is received earlier, when an event that cancels execution of a job occurs after that, the recovery processing results in a waste of time and energy. In this case, although convenience is improved, energy-saving properties are not sufficient.

Thus, in the present exemplary embodiment, a power switching instruction is issued earliest, and then, the recovery request is output. In this way, both convenience and energy-saving properties are satisfied.

Hereinafter, power switching control and recovery control of the main controller 200 when a job execution request is received from the PC 21 during the sleep mode will be described with reference to the flowcharts of FIGS. 7 and 8.

Figure 7:
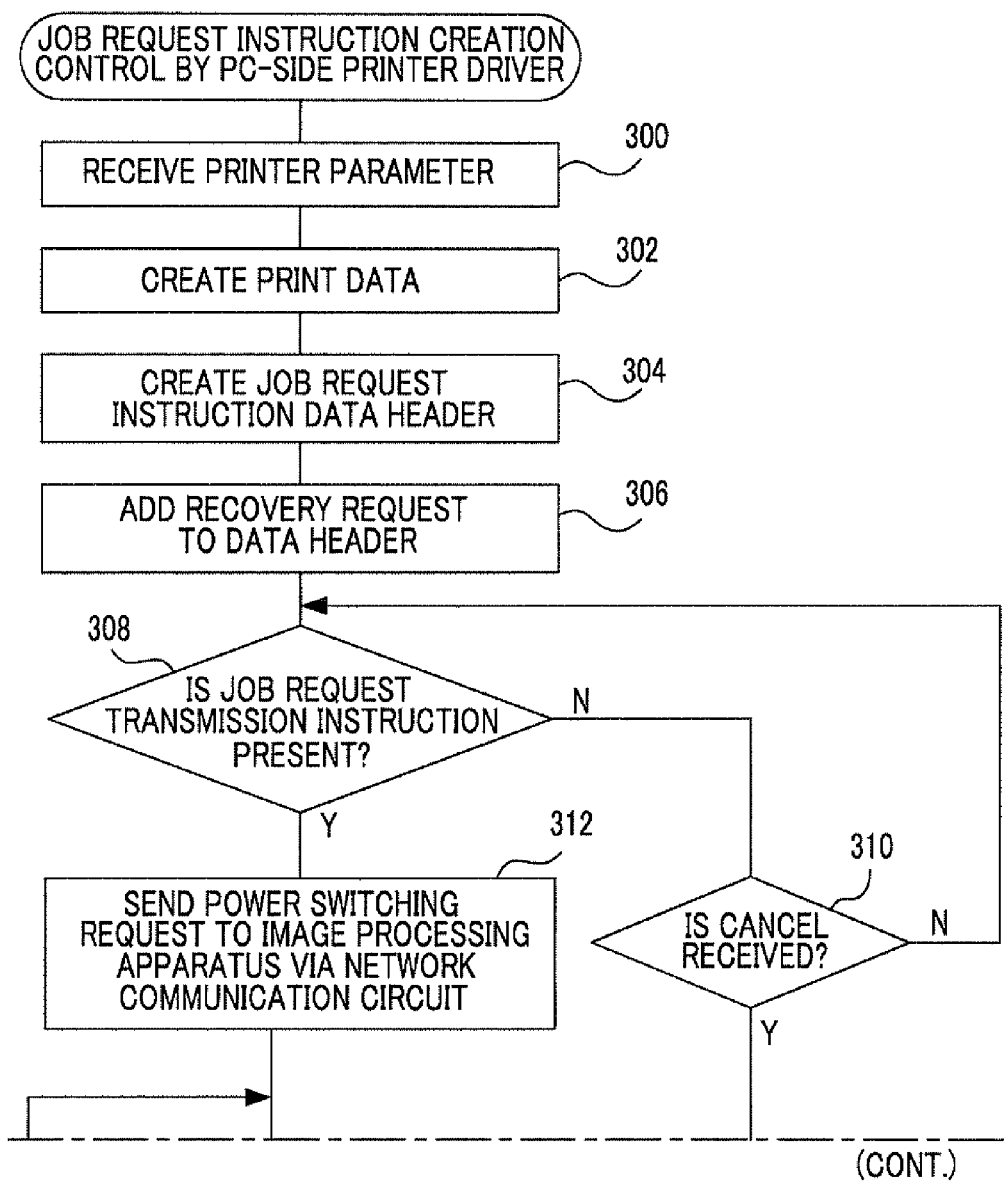
FIG. 7 is a flowchart illustrating a job request instruction creation control by a PC-side printer driver according to the present exemplary embodiment.

FIG. 7 is a flowchart illustrating the flow of a job request instruction creation control by the printer driver of the PC 21.

In step 300, printer parameters are received. Printer parameters stored in advance may be read. Subsequently, in step 302, print data is created. The print data include information on the number of copies, a sheet type, monochrome/color, image density, and the like in addition to image data.

When creation of print data in step 302 ends, the flow proceeds to step 304, and a data header for the job request instruction for sharing information such as a communication protocol is created.

Subsequently, in step 306, a recovery request is added to the data header created in step 304, and the flow proceeds to step 308. The recovery request is added when the image processing apparatus 10 designated by the printer parameters includes a sleep mode. Alternatively, the recovery request may be added when the image processing apparatus 10 is in the sleep mode at the time when the printer parameters are received.

Subsequently, in step 308, it is determined whether a job request transmission instruction is received from an operator who is operating the printer driver. For example, the job request transmission instruction is output when the operator clicks on an "OK" button on the printer driver screen.

When a negative determination result is obtained in step 308, the flow proceeds to step 310, and it is determined whether a cancellation request is received. When a negative determination result is obtained in step 310, the flow returns to step 308, and the processes of steps 308 and 310 are repeated until a positive determination result is obtained in any one of the steps.

When a positive determination result is obtained in step 310, the flow proceeds to step 316, and a job request cancellation process is performed. In this way, this routine ends.

When a positive determination result is obtained in step 308, the flow proceeds to step 312, a power switching request is transmitted to the image processing apparatus 10 prior to the job request instruction via the network communication circuit 20.

Subsequently, in step 314, it is determined whether a cancellation request is received. When a positive determination result is obtained in step 314, the flow proceeds to step 316, and a job request cancellation process is performed. In this way, this routine ends.

Moreover, when a negative determination result is obtained in step 314, the flow proceeds to step 318, and it is determined whether a predetermined period has elapsed. When a negative determination result is obtained in step 318, the flow returns to step 314.

Moreover, when a positive determination result is obtained in step 318, the flow proceeds to step 320, and the recovery request is transmitted to the image processing apparatus 10 prior to the job request instruction via the network communication circuit 20.

Subsequently, in step 322, the job request instruction is transmitted via the network communication circuit 20.

Figure 8:
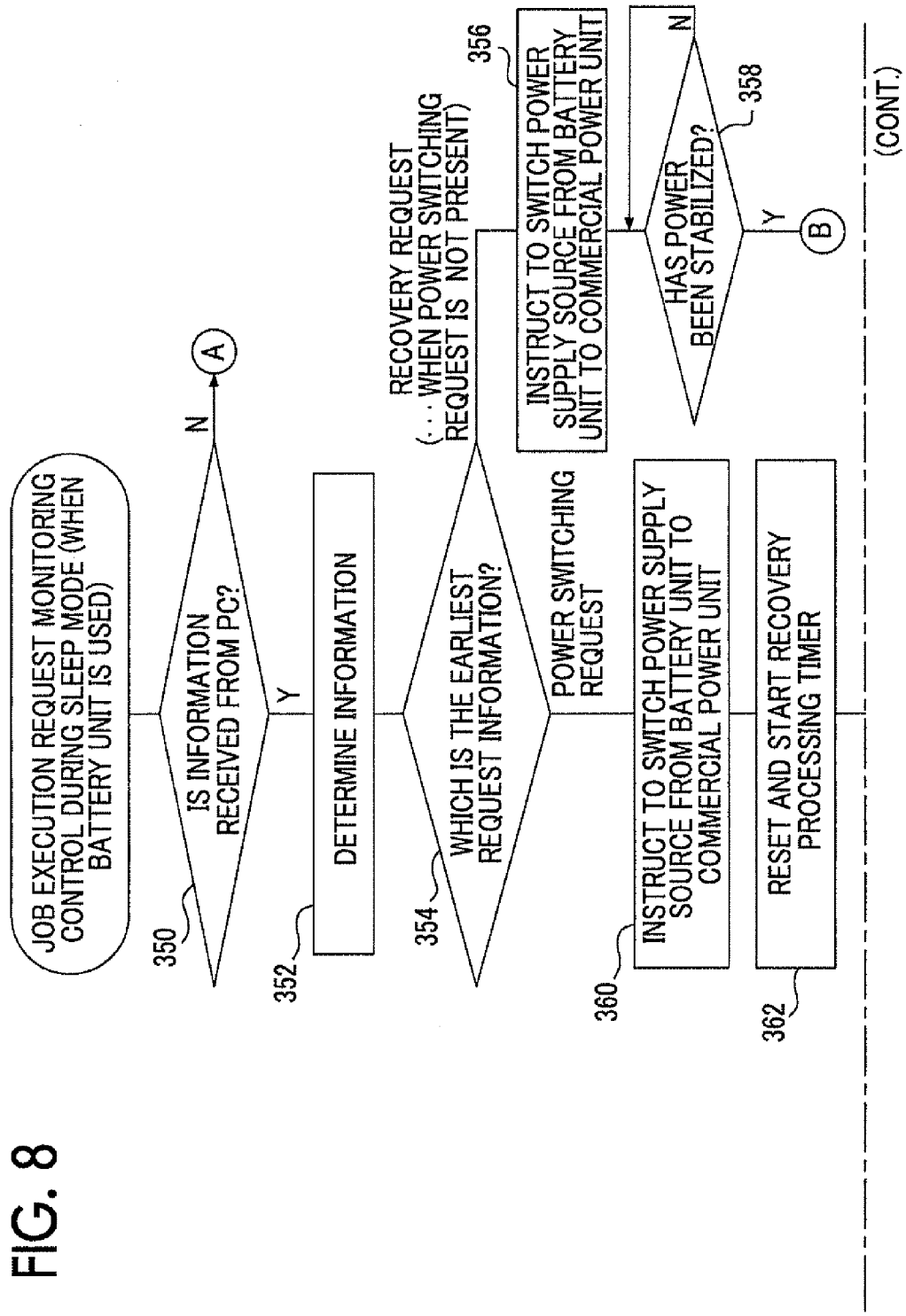
FIG. 8 is a flowchart illustrating a job execution request monitoring control routine during a sleep mode according to the present exemplary embodiment.

FIG. 8 is a flowchart illustrating a job execution request monitoring control during the sleep mode in the image processing apparatus 10. In this flowchart, description of the recovery from the sleep mode is specialized to the job execution request of the PC 21. The recovery from the sleep mode by the cooperation of the first and second human sensors 28 and 30 is executed by separate control, and description thereof will not be provided.

In step 350, it is determined whether information is received from the PC 21, and when a negative determination result is obtained, this routine ends.

Moreover, when a positive determination result is obtained in step 350, the flow proceeds to step 352, and the information is determined.

Subsequently, in step 354, it is determined whether the earliest request information within the information determined in step 352 is a power switching request or a recovery request.

When the earliest request information is the recovery request in step 354, the flow proceeds to step 356. This process is executed in order to deal with a case where the printer driver is not updated to the latest version or is a universal printer driver, or a printer driver of an older version in which the battery unit 241 is not mounted in addition to the commercial power unit 242, and for example, in which power switching elements are not incorporated. By doing so, the printer driver is not rejected.

That is, in step 356, it is instructed to switch the power supply source from the battery unit 241 to the commercial power unit 242 based on the recovery request. Subsequently, the flow proceeds to step 358, and it is determined whether power has been stabilized. When a positive determination result is obtained in step 358, the flow proceeds to step 372, and it is instructed to recover the main controller 200. In this way, this routine ends.

On the other hand, when the earliest request information is determined to be the power switching request in step 354, the flow proceeds to step 360.

In step 360, it is instructed to switch the power supply source from the battery unit 241 to the commercial power unit 242. Subsequently, the flow proceeds to step 362, and a recovery processing timer is reset and restarted. Then, the flow proceeds to step 364.

In step 364, it is determined whether power has been stabilized. When a positive determination result is obtained in step 364, the flow proceeds to step 366, and it is determined whether the time has reached a predetermined time.

When a positive determination result is obtained in step 366, it is determined that the recovery request which has to be transmitted after the power switching request is not received, and the job request itself is cancelled. Then, the flow proceeds to step 368, and it is instructed to switch the power supply source from the commercial power unit 242 to the battery unit 241. In this way, this routine ends. In this way, time-wasting recovery processing of the main controller 200 is prevented.

Moreover, when a negative determination result is obtained in step 366, the flow proceeds to step 370, and it is determined whether the job execution request (recovery request) is present. When a negative determination result is obtained in step 370, and the flow returns to step 366.

On the other hand, when a positive determination result is obtained in step 370, the flow proceeds to step 372, and it is instructed to recover the main controller 200. In this way, this routine ends.

That is, when outputting a job request, a power switching request is first output to switch the power supply source from the battery unit 241 to the commercial power unit 242. After that, the process of recovering the main controller 200 is performed only when there is a recovery request within a predetermined period. Thus, the recovery of the main controller 200 is performed immediately without wasting time in power switching processing. On the other hand, when the job request is cancelled, the recovery of the main controller 200 is prevented. In this way, both energy-saving properties and convenience are satisfied.

The battery unit 141 of the present exemplary embodiment is not limited to primary batteries (manganese batteries, alkaline manganese batteries, nickel-based rechargeable batteries, oxyride dry-cell batteries, silver oxide batteries, mercury batteries, lithium batteries, and the like) in which conversion (so-called discharge) of chemical energy to electrical energy in one direction occurs only once.

That is, the battery unit 241 may be secondary batteries (lead-acid batteries, lithium-ion secondary batteries, lithium-ion polymer secondary batteries, nickel-hydrogen batteries, nickel-cadmium batteries, and the like) which may be used as batteries by storing electricity by performing charging and which may be used repeatedly.

Moreover, a solar system which uses solar energy and a regenerative energy system that collects energy dissipated from the image processing apparatus 10 and converts the energy into electrical energy may be employed in charging, and these systems may be used in combination. The regenerative energy may use residual heat from the fuser of the image forming unit 240 and may use the driving of rollers of a sheet transport system.

Moreover, the battery unit may be charged during hours of low electricity cost, for example, when the commercial power supply 242 is used. In this case, power consumption during the sleep mode may be decreased apparently to "power 0". This also has an effect of decreasing peak power (the amplitude of power consumption is decreased).

MODIFICATION EXAMPLE

In the above embodiment, in the job request instruction creation control routine by the PC-side printer driver illustrated in FIG. 7, first, printer parameters are received in step 300, and print data is created in step 302. After that, in step 304, a data header for the job request instruction is created. However, the steps 300 and 302 of FIG. 7 may be executed after the power switching request is transmitted to the image processing apparatus via the network communication circuit in step 312. This flow is illustrated in FIG. 9. In FIG. 9, the step numbers and the processing content are the same as those of FIG. 7, and a symbol A is added to the end of step numbers. In the process flow of FIG. 9, it is possible to save the time for receiving printer parameters and creating print data.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control device comprising:
   a first power supply which is a power supply source of an operating unit that operates with power supplied and a main control unit that controls the operating unit, and which uses commercial power as a main supply source thereof;
   a second power supply which is a power supply source that is provided separately from the first power supply so as to supply minimum necessary power to create a power-saving state;
   a switching unit that switches to a power supply source selected from the first and second power supplies;
   a receiving unit that receives an external request signal which requires the operation of the operating unit and the main control unit;
   a determining unit that determines whether the external request signal received by the receiving unit is a switching request signal for instructing switching of a power supply destination by the switching unit or a recovery request signal for instructing the supply of power from the first power supply to the operating unit and the main control unit;
   a switching controller that controls the switching unit so that the power supply source is switched to the first power supply when a power-saving state is created in response to the supply of power from the second power supply, and the determining unit determines that the external request signal is the switching request signal; and
   a recovery unit that executes an operation of recovering at least the main control unit, which was not receiving power, when the recovery request signal is received by the receiving unit within a predetermined period after the power supply source is switched by the switching controller.

2. The power supply control device according to claim 1, wherein
   the predetermined period starts when a stable state where the voltage or current supplied from the first power supply falls within a predetermined allowable range after the second power supply is switched to the first power supply by the control of the switching controller is created.

3. The power supply control device according to claim 1, wherein
   the switching controller switches the power supply source to the second power supply when the recovery request signal is not received by the receiving unit even after the elapse of the predetermined period after the power supply source is switched to the first power supply.

4. The power supply control device according to claim 2, wherein
   the switching controller switches the power supply source to the second power supply when the recovery request signal is not received by the receiving unit even after the elapse of the predetermined period after the power supply source is switched to the first power supply.

5. The power supply control device according to claim 1, wherein
   the receiving unit, the determining unit, the switching controller, and the recovery unit function as a part of a determination controller that operates with the supply of power from the second power supply.

6. The power supply control device according to claim 2, wherein
   the receiving unit, the determining unit, the switching controller, and the recovery unit function as a part of a determination controller that operates with the supply of power from the second power supply.

7. The power supply control device according to claim 3, wherein
   the receiving unit, the determining unit, the switching controller, and the recovery unit function as a part of a determination controller that operates with the supply of power from the second power supply.

8. The power supply control device according to claim 4, wherein
   the receiving unit, the determining unit, the switching controller, and the recovery unit function as a part of a determination controller that operates with the supply of power from the second power supply.

9. An image processing apparatus comprising:

the power supply control device according to claim 1, wherein the operating unit includes at least one of an operation and display unit that includes an operation unit that receives instructions of the user and a display unit that displays an operation state, an image reading unit that reads an image from a document image, an image forming unit that forms an image on a recording sheet based on image information, and a facsimile communication controller that transmits an image to a destination in accordance with a predetermined communication protocol, and the main control unit collectively controls the image reading unit, the image forming unit, and the facsimile communication controller and performs an image processing function in cooperation in response to the instruction from the user based on an operation of the operation and display unit or the reception of an external request signal.

10. A non-transitory computer-readable medium storing a power supply control program causing a computer to execute as the power supply control device according to claim 5.

11. An image processing control driver in which a program is included and stored on a non-transitory computer-readable medium, wherein when an image processing execution request is transmitted to the image processing apparatus of claim 9 via a communication circuit network, the program transmits the switching request signal after the image processing execution request is received and before image information for the image processing is transmitted, or the program transmits the switching request signal when the image processing apparatus is selected on a selection screen.

\* \* \* \* \*